United States Patent
Chen et al.

(10) Patent No.: US 12,259,516 B2
(45) Date of Patent: Mar. 25, 2025

(54) DOWNHOLE DETECTION OF LITHIUM CONTAINING MINERALS BY LITHIUM 7 NUCLEAR MAGNETIC RESONANCE

(71) Applicant: Halliburton Energy Services, Inc., Houston, TX (US)

(72) Inventors: Songhua Chen, Liberty Hill, TX (US); Christopher Michael Jones, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 66 days.

(21) Appl. No.: 18/227,152

(22) Filed: Jul. 27, 2023

(65) Prior Publication Data

US 2025/0035809 A1 Jan. 30, 2025

(51) Int. Cl.
*G01V 3/32* (2006.01)

(52) U.S. Cl.
CPC ..................... *G01V 3/32* (2013.01)

(58) Field of Classification Search
CPC ........................................................ G01V 3/32
See application file for complete search history.

(56) References Cited

U.S. PATENT DOCUMENTS

| | | | |
|---|---|---|---|
| 3,667,035 A | 5/1972 | Slichter | |
| 5,712,566 A | 1/1998 | Taicher et al. | |
| 6,051,973 A | 4/2000 | Prammer | |
| 8,115,481 B2 * | 2/2012 | Chen | G01V 3/32 324/306 |
| 8,610,431 B2 | 12/2013 | Chen et al. | |
| 8,860,412 B2 * | 10/2014 | Leveridge | G01V 3/32 324/303 |

(Continued)

FOREIGN PATENT DOCUMENTS

WO 2015200789 A1 12/2015

OTHER PUBLICATIONS

Chandler, R.N. et al., "Reliable Nuclear Magnetism Logging-With Examples in Effective Porosity and Residual Oil Saturation", SPWLA Twenty-Eighth Annual Logging Symposium, Jun. 29-Jul. 2, 1987.

(Continued)

*Primary Examiner* — Gregory H Curran
(74) *Attorney, Agent, or Firm* — NOVAK DRUCE CARROLL LLP

(57) ABSTRACT

Described herein are systems and techniques for improving an accuracy of determinations made using data sensed in a wellbore or in a laboratory. Nuclear magnetic resonance (NMR) sensing devices may be used to collect data in a wellbore or lab. NMR sensing devices include a magnet (e.g., a permanent magnet or electromagnet) that provides a magnetic field that aligns the spins of protons in substances near the NMR sensing device. The magnetic field strength provided by the magnet of the NMR sensing device affects the sensitivity of the NMR sensing device and affects frequencies that the NMR sensing device effectively uses when the NMR sensing device operates. Systems and techniques of the present disclosure may measure concentrations of lithium in brine deposits when identifying particular brine deposits that include sufficient lithium concentrations to justify extracting lithium from those particular brine deposits.

20 Claims, 8 Drawing Sheets

(56) References Cited

U.S. PATENT DOCUMENTS

| | | |
|---|---|---|
| 10,197,698 B2 | 2/2019 | Reiderman et al. |
| 10,295,627 B2 | 5/2019 | Li |
| 10,527,748 B2 | 1/2020 | Li et al. |
| 10,739,490 B2 | 8/2020 | Li et al. |
| 2011/0181278 A1 | 7/2011 | Chen et al. |
| 2016/0202385 A1 | 7/2016 | Pelletier et al. |
| 2022/0034862 A1* | 2/2022 | Fayez ............... G01N 33/2823 |
| 2022/0381714 A1 | 12/2022 | Mitchell et al. |

OTHER PUBLICATIONS

Morriss, C.E. et al., "Hydrocarbon Saturation and Viscosity Estimation from NMR Logging in Belridge Diatomite", The Log Analyst; Mar.-Apr. 1997; vol. 38, No. 2.

Horkowitz, John P. et al., "Residual Oil Saturation Measurements in Carbonates with Pulsed NMR Logs", The Log Analyst; Mar.-Apr. 1997; pp. 73-83.

Abstract of XIAO, Yu-Dong et al., "MRI contrast agents: Classification and application", Int J Mol Med. Nov. 2016;38 (5):1319-1326. doi: 10.3892/ijmm.2016.2744. Epub Sep. 21, 2016. PMID: 27666161.

Abstract of Wahsner, Jessica et al, "Chemistry of MRI Contrast Agents: Current Challenges and New Frontiers", Chem Rev. Jan. 23, 2019;119(2): 957-1057. doi:10.1021/acs.chemrev.8b00363.

International Search Report & Written Opinion; PCT Application No. PCT/US2023/028984; mailed Apr. 26, 2024.

* cited by examiner

DOWNHOLE DETECTION OF LITHIUM CONTAINING MINERALS BY LITHIUM 7 NUCLEAR MAGNETIC RESONANCE

TECHNICAL FIELD

The present disclosure is generally directed to improving operation of a nuclear magnetic resonance (NMR) device. More specifically, the present disclosure is directed to enhancing the sensitivity of measurements made by an NMR device.

BACKGROUND

Minerals like lithium are in high demand and the demand for lithium is anticipated to increase with the demand for electrical components that are made from lithium (e.g., batteries and capacitors). Even through sources for lithium include mines dug into the Earth, much of the world's lithium reserves are found in brines that reside at the surface of the Earth and in underground "saltwater" deposits. Conventional techniques used to separate chemical compounds from mineral containing brines include evaporating water into the atmosphere. Applying such techniques in mass to collect minerals from underground brines may result in a drop in the water table or may affect ecosystems in other ways that may have negative consequences.

BRIEF DESCRIPTION OF THE DRAWINGS

In order to describe the manner in which the features and advantages of this disclosure can be obtained, a more particular description is provided with reference to specific implementations thereof which are illustrated in the appended drawings. Understanding that these drawings depict only exemplary implementations of the disclosure and are not therefore to be considered to be limiting of its scope, the principles herein are described and explained with additional specificity and detail through the use of the accompanying drawings in which.

DETAILED DESCRIPTION

Figure 1A:
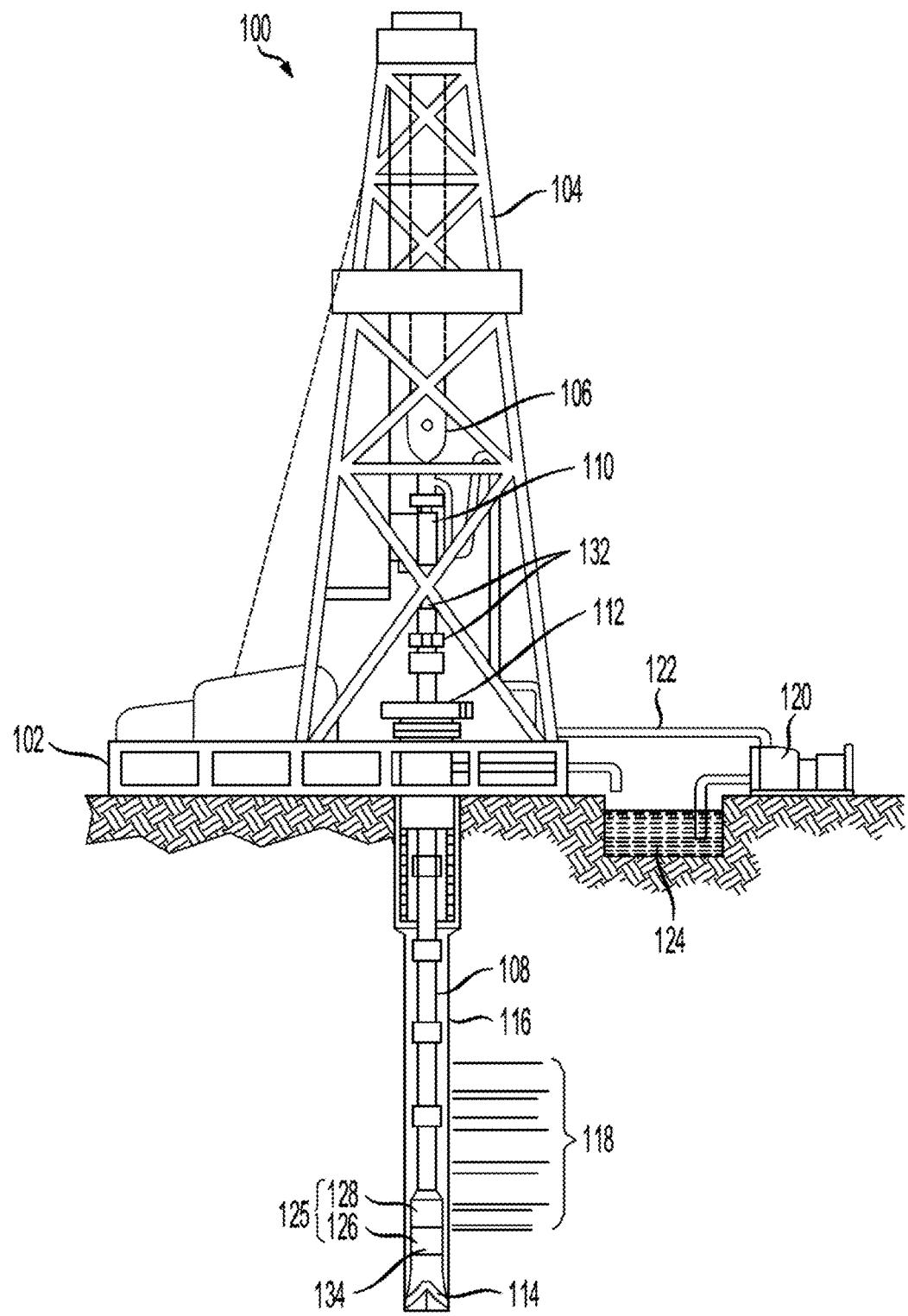
FIG. 1A is a schematic diagram of an example logging while drilling wellbore operating environment, in accordance with various aspects of the subject technology.

Various aspects of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the principles disclosed herein. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

It will be appreciated that for simplicity and clarity of illustration, where appropriate, reference numerals have been repeated among the different figures to indicate corresponding or analogous compounds. In addition, numerous specific details are set forth in order to provide a thorough understanding of the methods and apparatus described herein. However, it will be understood by those of ordinary skill in the art that the methods and apparatus described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the present disclosure.

Described herein are systems, apparatuses, processes (also referred to as methods), and computer-readable media (collectively referred to as "systems and techniques") for improving an accuracy of determinations made using data sensed in a wellbore or a laboratory. Nuclear magnetic resonance (NMR) sensing devices may be used to collect data in a wellbore or lab. NMR sensing devices include a magnet (e.g., a permanent magnet or electromagnet) that provides a magnetic field that aligns the spins of protons in substances near the NMR sensing device. The magnetic field strength provided by the magnet of the NMR sensing device affects the sensitivity of the NMR sensing device and affects frequencies that the NMR sensing device effectively uses when the NMR sensing device operates. Systems and techniques of the present disclosure may measure concentrations of lithium in brine deposits when identifying particular brine deposits that include sufficient lithium concentrations to justify extracting lithium from those particular brine deposits.

The greater the magnetic field strength of the NMR sensing device, the greater the sensitivity of the NMR sensing device. In operation, an NMR sensing device applies a magnetic field that aligns the spins protons included in a sample (e.g., a substance(s), a material, a structure, a rock formation, a mixture, mud, fluid, a tool and/or device, an object, an element, matter, a wellbore system and/or component, etc.) that are near the NMR sensing device. Once the protons in the nearby (e.g., within a threshold proximity to the NMR sensing device) sample are aligned, the NMR sensing device emits (transmits) a set of radio frequency (RF) signals that disrupt these aligned protons. This disruption of these spins may be sensed by a sensor (e.g., a coil or antenna) at the NMR sensing device. When the energy emitted by the disrupted protons passes by the sensor, the sensor generates one or more signals that have characteristics that can be evaluated to identify what materials are included in the sample near the NMR sensing device. While the protons included in some compounds are easily detected using an NMR sensing device, other compounds that can be detected using NMR sensing devices are more difficult to detect. For example, compounds like water and oil that include hydrogen protons are typically easy to detect, and materials like lithium are much more difficult to detect. Minerals like lithium are in high demand today and the demand for lithium is anticipated to increase with the demand for electrical components (e.g., batteries and capacitors) that are made from lithium. What are needed are new methods and systems that detect materials like lithium.

Even through sources for lithium include mines dug into the Earth, much of the world's lithium reserves are found in brines that reside at the surface of the Earth and in underground "saltwater" deposits. Conventional techniques used to separate chemical compounds from mineral containing brines include evaporating water into the atmosphere. Applying such techniques in mass to collect minerals from underground brines may result in a drop in the water table or may affect ecosystems in other ways that may have negative consequences. Furthermore, when concentrations of the minerals are below some threshold level, separating the minerals from water of the bines can be too costly to justify commercial operations. This means that to economically separate minerals like lithium from brines, concentrations of lithium in the brines should at least meet a threshold level.

Producing lithium from relatively rich brines also means that volumes of brine removed from an area to meet a production target can be minimized. As such, identifying locations where lithium is present in acceptable concentrations (at or above a threshold level) is important for various reasons. Separating lithium from brine may result in both lithium and water being output from a separation process. Depending on a particular separation process, water output from the process may be potable water or may be non-potable water. In instances when potable water is output, that potable water may be used for human consumption or may be used for irrigating crops. In instances when non-potable water is output, the output water may still be suitable for irrigation even though it may not be suitable for drinking. In instances when water output by a separation process is not fit for drinking or irrigation, it may be disposed of in an environmentally friendly way. For example, when output water includes too much sodium for human consumption or irrigation, that output water may be pumped into sediments of the Earth. In such instances, sediments that include low concentrations of lithium may be selected for disposing the output water.

A rule for disposing the output water may specify that a disposal location should not be hydraulically connected to a lithium-rich reservoir. As such, systems and techniques of the present disclosure may identify areas that have high lithium concentrations and areas that have low lithium concentrations. Systems and techniques of the present disclosure are directed to lithium (e.g., $^7$Li) NMR logging to identify areas where lithium may be extracted and to identify areas where output water may be provided to.

Examples of the systems and techniques described herein are illustrated in the figures that follow.

FIG. 1A is a schematic diagram of an example logging while drilling wellbore operating environment, in accordance with various aspects of the subject technology. The drilling arrangement shown in FIG. 1A provides an example of a logging-while-drilling (commonly abbreviated as LWD) configuration in a wellbore drilling scenario 100. The LWD configuration can incorporate sensors (e.g., EM sensors, seismic sensors, gravity sensor, image sensors, etc.) that can acquire formation data, such as characteristics of the formation, components of the formation, etc. For example, the drilling arrangement shown in FIG. 1A can be used to gather formation data through an electromagnetic imager tool (not shown) as part of logging the wellbore using the electromagnetic imager tool. The drilling arrangement of FIG. 1A also exemplifies what is referred to as Measurement While Drilling (commonly abbreviated as MWD) which utilizes sensors to acquire data from which the wellbore's path and position in three-dimensional space can be determined. FIG. 1A shows a drilling platform 102 equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, it creates a wellbore 116 that passes through various subterranean formations 118. A pump 120 circulates drilling fluid through a supply pipe 122 to top drive 110, down through the interior of drill string 108 and out orifices in drill bit 114 into the wellbore. The drilling fluid returns to the surface via the annulus around drill string 108, and into a retention pit 124. The drilling fluid transports cuttings from the wellbore 116 into the retention pit 124 and the drilling fluid's presence in the annulus aids in maintaining the integrity of the wellbore 116. Various materials can be used for drilling fluid, including oil-based fluids and water-based fluids.

Logging tools 126 can be integrated into the bottom-hole assembly 125 near the drill bit 114. As drill bit 114 extends into the wellbore 116 through the formations 118 and as the drill string 108 is pulled out of the wellbore 116, logging tools 126 collect measurements relating to various formation properties as well as the orientation of the tool and various other drilling conditions. The logging tool 126 can be applicable tools for collecting measurements in a drilling scenario, such as the electromagnetic imager tools described herein. Each of the logging tools 126 may include one or more tool components spaced apart from each other and communicatively coupled by one or more wires and/or other communication arrangement. The logging tools 126 may also include one or more computing devices communicatively coupled with one or more of the tool components. The one or more computing devices may be configured to control or monitor a performance of the tool, process logging data, and/or carry out one or more aspects of the methods and processes of the present disclosure.

The bottom-hole assembly 125 may also include a telemetry sub 128 to transfer measurement data to a surface receiver 132 and to receive commands from the surface. In at least some cases, the telemetry sub 128 communicates with a surface receiver 132 by wireless signal transmission (e.g., using mud pulse telemetry, EM telemetry, or acoustic telemetry). In other cases, one or more of the logging tools 126 may communicate with a surface receiver 132 by a wire, such as wired drill pipe. In some instances, the telemetry sub 128 does not communicate with the surface, but rather stores logging data for later retrieval at the surface when the logging assembly is recovered. In at least some cases, one or more of the logging tools 126 may receive electrical power from a wire that extends to the surface, including wires extending through a wired drill pipe. In other cases, power is provided from one or more batteries or via power generated downhole.

Collar 134 is a frequent component of a drill string 108 and generally resembles a very thick-walled cylindrical pipe, typically with threaded ends and a hollow core for the conveyance of drilling fluid. Multiple collars 134 can be included in the drill string 108 and are constructed and intended to be heavy to apply weight on the drill bit 114 to assist the drilling process. Because of the thickness of the collar's wall, pocket-type cutouts or other type recesses can be provided into the collar's wall without negatively impacting the integrity (strength, rigidity and the like) of the collar as a component of the drill string 108.

Figure 1B:
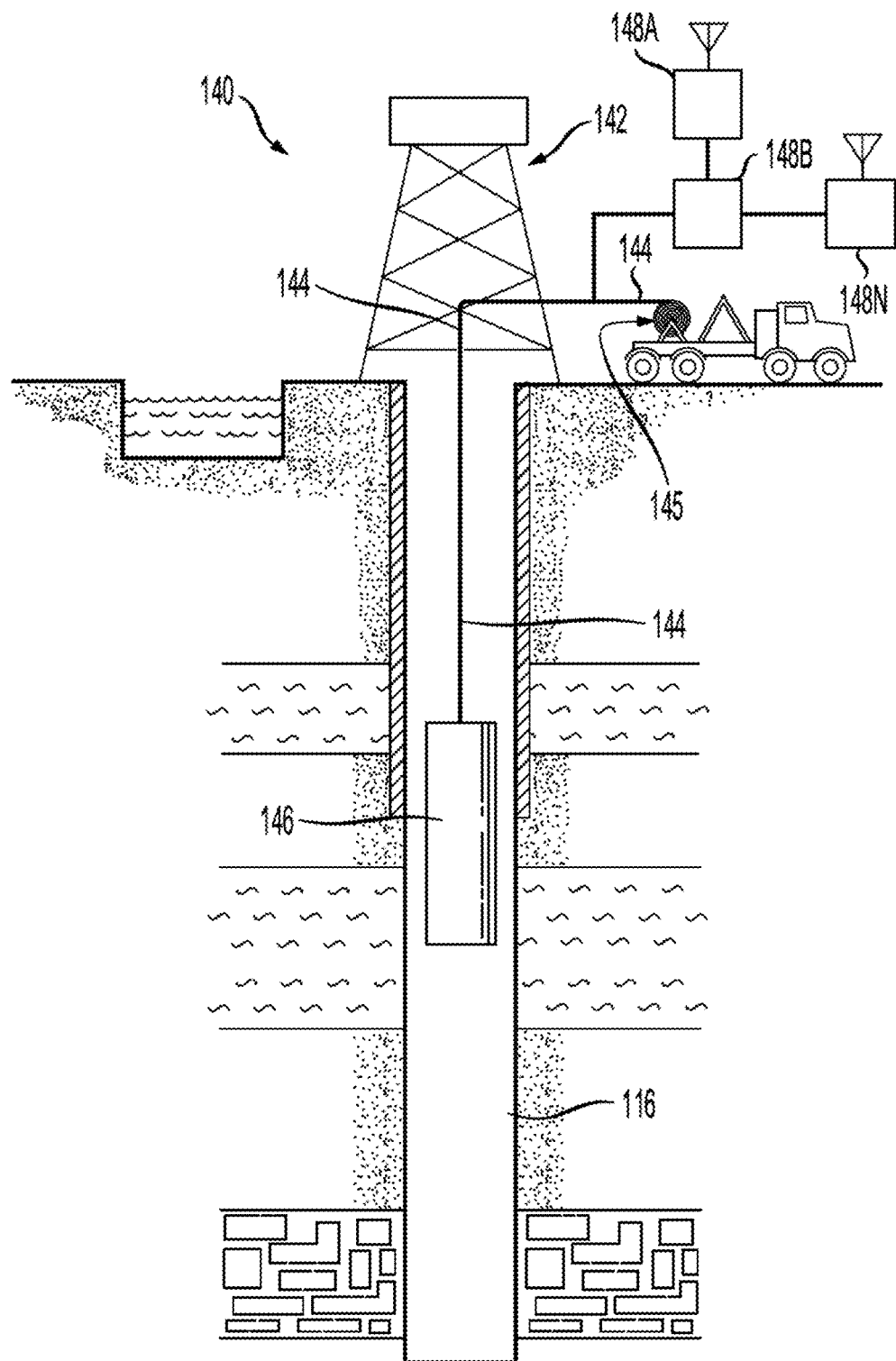
FIG. 1B is a schematic diagram of an example downhole environment having tubulars, in accordance with various aspects of the subject technology.

FIG. 1B is a schematic diagram of an example downhole environment having tubulars, in accordance with various aspects of the subject technology. In this example, an example system 140 is depicted for conducting downhole measurements after at least a portion of a wellbore has been drilled and the drill string removed from the well. An electromagnetic imager tool (not shown) can be operated in the example system 140 shown in FIG. 1B to log the wellbore. A downhole tool is shown having a tool body 146 in order to carry out logging and/or other operations. For example, instead of using the drill string 108 of FIG. 1A to lower the downhole tool, which can contain sensors and/or other instrumentation for detecting and logging nearby characteristics and conditions of the wellbore 116 and surrounding formations, a wireline conveyance 144 can be used. The tool body 146 can be lowered into the wellbore 116 by wireline conveyance 144. The wireline conveyance 144 can be anchored in the drill rig 142 or by a portable means such as a truck 145. The wireline conveyance 144 can include one or more wires, slicklines, cables, and/or the like, as well as tubular conveyances such as coiled tubing, joint tubing, or other tubulars. The downhole tool can include an applicable tool for collecting measurements in a drilling scenario, such as the electromagnetic imager tools described herein.

The illustrated wireline conveyance 144 provides power and support for the tool, as well as enabling communication between data processors 148A-N on the surface. In some examples, the wireline conveyance 144 can include electrical and/or fiber optic cabling for carrying out communications. The wireline conveyance 144 is sufficiently strong and flexible to tether the tool body 146 through the wellbore 116, while also permitting communication through the wireline conveyance 144 to one or more of the processors 148A-N, which can include local and/or remote processors. The processors 148A-N can be integrated as part of an applicable computing system, such as the computing device architectures described herein. Moreover, power can be supplied via the wireline conveyance 144 to meet power requirements of the tool. For slickline or coiled tubing configurations, power can be supplied downhole with a battery or via a downhole generator.

As mentioned above, one type of equipment that may be used to collect data in a wellbore is a nuclear magnetic resonance (NMR) sensing device. When an NMR sensing device is deployed in a wellbore, a magnetic field provided by a magnet of the NMR sensing device aligns at least some of the protons in materials that are near the NMR sensing device. The spins of protons affected by the magnetic field may align in one of two directions, a first direction, the $-\frac{1}{2}$ spin state, that is associated with a first energy state and in a second direction, the $+\frac{1}{2}$ spin state, that is associated with a second energy state.

Figure 2:
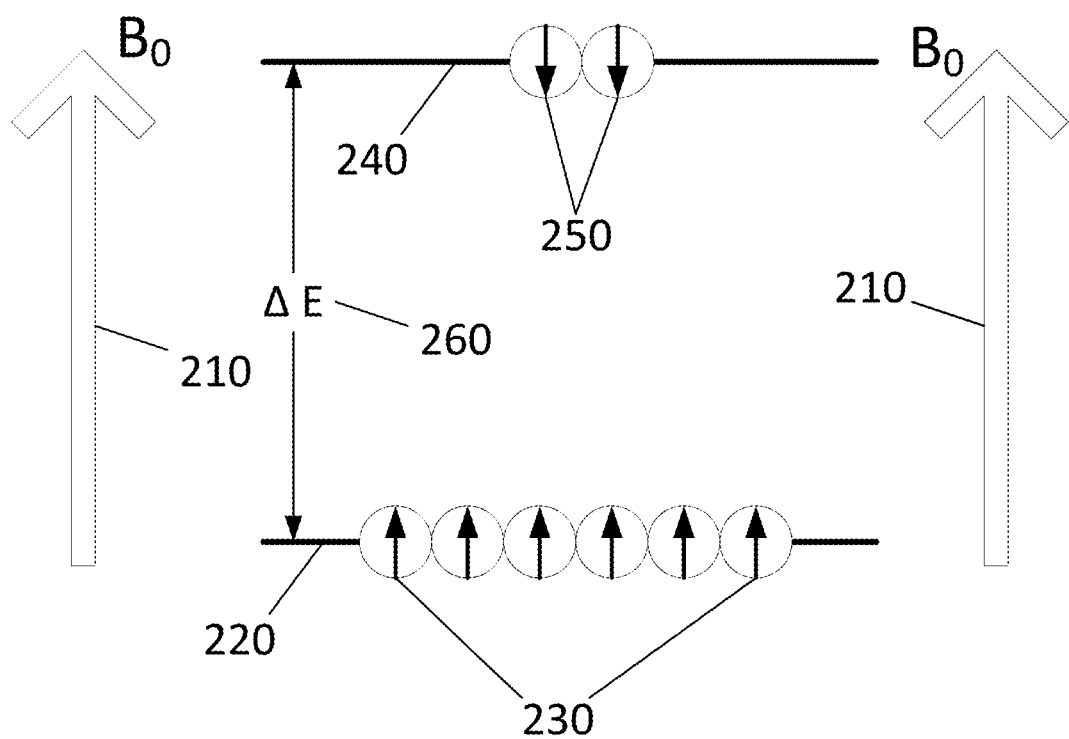
FIG. 2 shows how the directions of spins of protons included in a sample align when exposed to an external magnetic field, in accordance with various aspects of the subject technology.

FIG. 2 shows how the directions of spins of protons included in a sample align when exposed to an external magnetic field. FIG. 2 includes magnetic field 210 that has a field strength $B_0$. When magnetic field 210 is applied to the sample and given sufficient time, affected protons atoms of the sample will align with the magnetic field 210 in either the $-\frac{1}{2}$ spin state or the $+\frac{1}{2}$ spin state. Protons 230 are illustrated as circles with arrows pointing in an upwards direction, these upward arrows indicate that protons 230 are in the $+\frac{1}{2}$ spin state. Protons 250 are illustrated as circles with arrows pointing in a downward direction, these downward arrows indicate that protons 250 are in the $-\frac{1}{2}$ spin state. Lines 220 and 240 are energy states respectively associated with spins of protons 230 and 250. A value of energy $\Delta E$ (260) that separates the higher energy $-\frac{1}{2}$ spin state from the lower energy $+\frac{1}{2}$ spin state will increase with a value of applied magnetic field $B_0$. Note that there are more protons at the lower energy $+\frac{1}{2}$ spin state (e.g., protons 230) than protons that are at the higher energy $-\frac{1}{2}$ spin state (e.g., protons 250). The number of protons 230 at the lower energy state and the number of protons 250 at the higher energy state may correspond to a Boltzmann distribution, where the state distributions of protons at different energy states may vary as a function of temperature. Before a magnetic field is applied to a sample, the spins of protons included in that sample may be randomly distributed and the sample may have a net magnetic field of zero. As mentioned above, when a sample is placed in a magnetic field, at least some protons within the sample will align with the magnetic field. The amount of time it takes for the spins of protons to settle into alignment with the magnetic field (T1 time) may vary based on specific compounds that are included in the sample. Such T1 times are generally referred to spin-lattice relaxation times, longitudinal relaxation times, or alignment times. These T1 times are measures of how quickly a net magnetization vector recovers to alignment in the direction of an applied magnetic field.

While for some compounds like water or oil, illustrative examples of T1 times include three seconds and five seconds or less, this is not typically true for materials like lithium. In fact, depending on conditions, T1 times for lithium may be much longer (e.g., 10 seconds to over 100 seconds). This means that in certain circumstances and without using methods of the present disclosure, using NMR sensing devices to detect lithium concentrations may be considered impractical. Techniques of the present disclosure may combine an NMR enhancing substance with brines that may contain lithium in order to reduce T1 times and make NMR sensing practical for lithium production.

Figure 3:
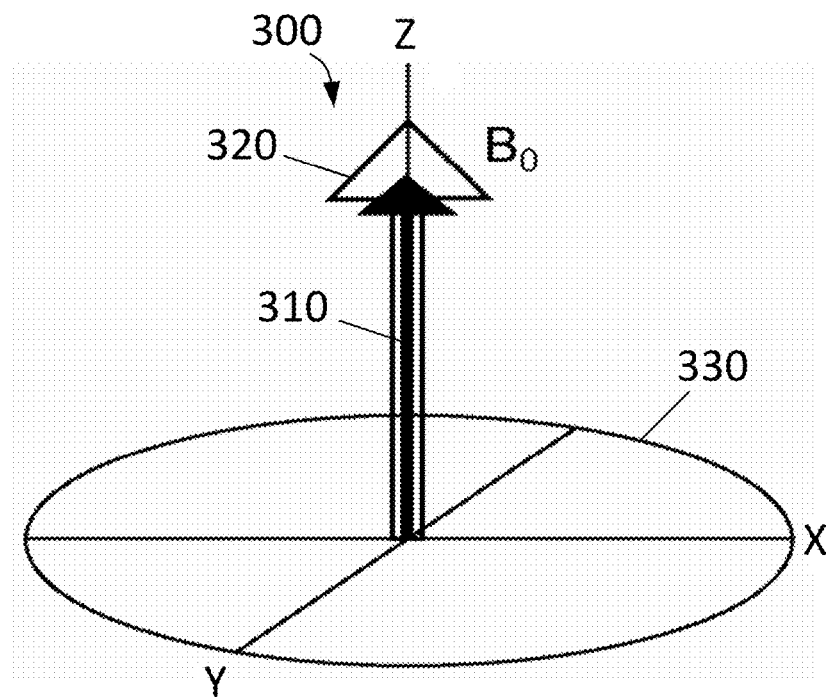
FIG. 3 includes a first image where a magnetic field aligns spins of protons in a sample and includes a second image where the spins of the protons in the magnetic field are disrupted by a radio frequency signal, in accordance with various aspects of the subject technology.
Figure 3:
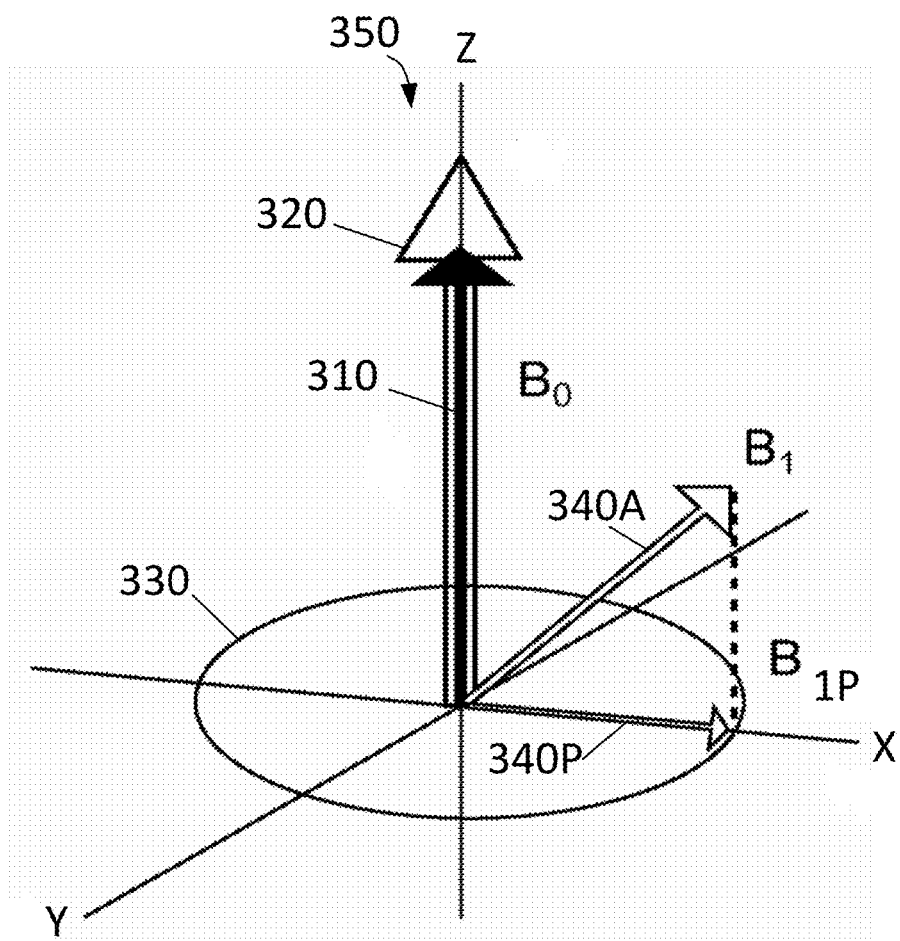

FIG. 3 includes two different images, a first image where proton spins of a sample are aligned with an applied magnetic field and a second image where proton spins of the sample are disrupted by radio frequency signals transmitted by an NMR device. FIG. 3 includes image 300 where applied magnetic field 310 of field strength $B_0$ is used to align the spins of protons in a sample parallel to the Z axis of image 300. A magnitude of vector 320 in image 300 may correspond to net (total parallel magnetic moment (of protons 230 of FIG. 2) and total anti-parallel magnetic moment (of protons 250 of FIG. 2) magnetic moments of proton spins that are parallel to applied magnetic field 310. Image 300 also includes an X axis and a Y axis that form plane 330.

After the spins of protons included in the sample are aligned with applied magnetic field 310, RF signals may be emitted by the NMR sensing device. Magnetic fields associated with these RF signals may disrupt the spins of the protons in a sample. A greater amount of energy of an RF pulse will result in a greater disruption of the proton spins. An amount of disruption in these spins may vary with a duration of the RF signal or with RF signal amplitude. Image 350 illustrates an instance where the net magnetic moment of spin is rotated with an offset angle from this Z axis as indicated by vector 340A. An angle associated with a change in spin direction may be referred to as a tipping angle. Antennas at the NMR sensing device sense changes in the spins of protons by measuring changes in electromagnetic fields along plane 330 may be referred to as RF field B1, 340P is the corresponding component perpendicular to B0, which is responsible for tipping proton spins.

RF signals with different energies may be used to disrupt the spins of protons by different amounts. The transmission of a first RF signal toward a sample may result in the angles of proton spins in the sample being changed by 90 degrees. As such, this first RF signal may be classified as a 90 degree RF signal pulse (or excitation pulse) that induces a 90 degree tipping angle. Similarly, the transmission of a second RF signal toward the sample may result in the angles of proton spins in the sample being changed by 180 degrees. Because of this, the second RF signal may be classified as a 180 degree RF signal pulse (or refocus pulse) that induces a 180 degree tipping angle. Since the tipping angle varies with RF signal energy, the 90 degree RF pulse may be twice as long or have twice the amplitude of the 180 degree pulse when tipping angle varies linearly with applied RF signal energy. NMR sensing devices may use other types of RF signal pulses. For example, a type of signal pulse that depolarizes (or randomizes) protons spins may be referred to as a chirp.

Operation of an NMR sensing device may include aligning protons in an applied magnetic field for a period of time, transmitting one or more RF signal pulses, and making one or more measurements by the NMR sensing device. This process may be repeated using different lengths of time period. Evaluations may then be performed to identify materials that are present in the sample based on known correspondences between the transmitted RF signal pulses and the measurements made by the NMR sensing device.

For a given applied magnetic field ($B_0$), NMR resonance frequency is different for different nuclei depending on the nucleus' corresponding gyromagnetic ratio. Therefore, in the same sensed volume where a well logging measurement is performed, only the resonant nucleus will be detectable. Chemical compounds may have different NMR characteristics, such as T1 and/or T2, for different species of nuclei. For a same type of nucleus in a different compound and in a different environment (such as bulk brine vs brine in the pore space of a rock formation), temperature of the underground formation, existence of paramagnetic minerals, etc., can have different T1 and T2 responses. Because of this, NMR devices may be used to identify compounds that are located at specific wellbore locations and may identify characteristics of subterranean formations, such as pore size, porosity, and permeability from collected data. Conditions that occur in a wellbore may include temperatures and pressures that are significantly different than conditions at the surface of the Earth. For example, the temperature inside a wellbore may be 150 degrees Celsius (C) when a surface temperature is 25 C. Because of the various temperature related effects that affect operation of an NMR sensing device and since NMR sensing devices are used in wellbores where temperature varies, an NMR sensing device may be calibrated before being used to collect wellbore data.

As mentioned above, techniques of the present disclosure include detecting threshold level concentrations of lithium contained in fluid (e.g., brine) deposits that may include lithium. In some instances, an NMR device may be deployed in a wellbore. In other instances, samples may be tested in a laboratory.

Naturally occurring lithium is typically composed of two stable isotopes: lithium six (Li) and lithium seven (Li). Typically, the natural abundance of lithium in a reservoir is about 7.5% $^6$Li and 92.5% $^7$Li. Furthermore, $^7$Li is more suitable than $^6$Li for downhole NMR measurements, because of its much higher natural abundance of $^7$Li. Furthermore, $^7$Li has greater NMR receptivity than Li.

In NMR spectroscopy, the term receptivity refers to how detectable a particular element is. Some elements are easily detected where other elements are less detectable. Typically, the receptivity of an element is a function of the abundance of the element's NMR-responsive isotope and that isotope's gyromagnetic ratio. Some isotopes have large gyromagnetic ratios but low abundance. Other isotopes are highly abundant yet have low gyromagnetic ratios. The gyromagnetic ratio ($\gamma$) of a particle or system is the ratio of the particle's magnetic moment to the particle's angular momentum.

A frequency ratio of $^7$Li versus $^1$H and $^6$Li versus $^1$H is 38.86% and 17.71%, respectively. This means that the receptivity of $^7$Li versus $^1$H and $^6$Li versus $^1$H correspond to 0.271 and 0.000641, respectively. $^6$Li and $^7$Li spin numbers are 1 and 3/2, respectively. The magnetic field strength of a downhole NMR logging tool is limited by the permanent magnet strength, and, thus, is limited by the borehole size and the magnet material. Given the same magnetic field, the relative intensity ($f_0^3 \cdot I(I+1)$) of NMR logging with $^7$Li is 422× more responsive than that of $^6$Li. Therefore, $^6$Li may not be suitable for downhole NMR measurement evaluations.

Even though the receptivity of $^7$Li is significantly better than $^6$Li, downhole logging detection and quantification of lithium content still faces significant challenges, mainly due to the weak NMR signal associated with detecting lithium by an NMR device. First, the concentration of lithium in underground brine reservoirs or salt flats is relatively low compared to protons or even sodium in brine at its native environment. Second, although a receptivity of $^7$Li is reasonably high, the spin lattice relaxation time (T1) of several lithium compounds may be in the range of tens of seconds, or even hundreds of seconds. These long T1 times may make it impractical to use repetition measurements to increase the signal-to-noise ratio (SNR) because doing so would take more time than is cost effective. As such, improvements in NMR technology are needed.

In some instances, a relaxation rate enhancer may be used to improve SNR. An example equation for an NMR device SNR can be expressed using Equation (1) below:

Equation (1): Signal to Noise Ratio Equation $$S/N \propto (\gamma B_0) \left[ \frac{\gamma^2 \hbar^2 B_0 N_s}{16 \pi^2 kT} \right] \left[ \frac{B_1}{i} \right] \left[ \frac{1}{V_{noise}} \right]$$

Here, $B_0$ is the magnetic field strength, The first factor ($\gamma B_0$) relates to the induced voltage, which is proportional to $B_0$. The symbol $\gamma$ included in Equation (1) is gyromagnetic ratio of a substance that the NMR device may be configured to sense. The gyromagnetic ratio of $^7$Li is greater than $^6$Li.

$$\left[\frac{\gamma^2 \hbar^2 B_0 N_s}{16\pi^2 kT}\right]$$

The second factor of Equation (1), is a net magnetic polarization, where Ns is the number of nuclei (in this case $^7$Li) in the sample, k is Boltzmann's constant, and T the absolute temperature. The third factor, $$\left[\frac{B_1}{i}\right],$$

is detector sensitivity that is a function of the RF magnetic field, $B_1$, produced per unit of input current, i. The final factor, $$\left[\frac{1}{V_{noise}}\right],$$

is the random thermal noise voltage which has contributions from both the sample and detector. Equation (1) may be rearranged by eliminating constants and temperature dependence. As such, Equation (1) may be is rewritten as Equation (2) below:

Equation (2): Simplified Signal to Noise Ratio Equation $$S/N \propto \frac{N_S \gamma^3 B_0^{B_1^2}}{V_{noise}}.$$

As discussed above, the larger spin number and higher natural abundance of $^7$Li as compared to $^6$Li collectively may make a scientist or engineer tune the NMR device to detect $^7$Li instead of $^6$Li. For a given detector, the random thermal noise voltage can be reduced by repeating response measurements. Assuming in a given time interval t time, t=$\Delta$T, the maximum number (n) of repeats is governed by the $^7$Li spin relaxation time T1 can be is approximated using Equation (3) below:

Equation (3): Number of Repeat Measurements Per Test Time Interval Equation $$n \approx \frac{\Delta T}{3 T_{1\_7Li}}$$

An amount of noise voltage reduction with n repeats may correspond to a factor of a factor of Vn. Thus, Equation (3) can be rewritten as Equation (4) below:

Equation (4): Noise Reduction Equation $$SNR(\Delta T) \propto N_S \gamma^3 B_0^2 B_1 \sqrt{T_{1\_7Li}}$$

Thus, a method to reduce $T_{1\_7Li}$ can increase SNR. Since lithium is a weak quadrupole which relaxes slowly, lithium has a long polarization time, commonly in the order of magnitude of seconds. In order to reduce the relaxation time of $^7$Li, a paramagnetic relaxation time enhancing element (an NMR relaxation enhancement agent) may be used to increase sensitivity. An observed T1 relaxation time may be reduced with the presence of a relaxation time enhancing element as described by Equation (5):

Equation (5): Enhanced Relaxation Time Equation $$\frac{1}{T_1^{obs}} = \frac{1}{T_1^{native}} + \frac{1}{T_1^{enhancer}}$$

$$\frac{1}{T_1^{enhancer}} = \rho_1 [C],$$

In such an instance, a value of where [C] and $\rho_1$ respectively refer to a concentration and relaxivity of the relaxation time enhancer. The type of relaxation time enhancer suitable for the stated purpose is paramagnetic chemical agent which either dissolves or mixes well with brine. For example, a positive magnetic resonance (MR) contrast agent used in magnetic resonance imaging (MRI) diagnosis may be selected for this purpose.

Equation (2) above shows that SNR is proportional to applied magnetic field B0 so by increasing a static magnetic field applied to a sensitive volume (e.g., a material being evaluated) is one way of increasing SNR. The NMR sensitive volume, located inside rock formation may be several inches away from the tool surface. As the static magnetic field is inversely proportional to the distance x from the magnet, a magnetic field B0 applied to the sensitive volume at a distance x from the magnet of an NMR device corresponds to Equation (6):

Equation (6): Magnetic Field vs Distance Equation $$B_0(x) \approx \frac{A}{x^s}$$

The farther the sensitive volume is away from the tool, the weaker the magnetic field. In Equation (7), A is a quantity that is dependent of the magnet configuration realization and magnetic field strength of the permanent magnet, s is also a quantity that depends on the magnet configuration. Approximately in the range of 2-3, x is the distance of the sensitive volume to the center of the magnet source. It is noted that an exact equation form of the distance-dependent magnetic field strength is more complicated and may be determined numerically using finite element analysis, based sensor simulation. For the current purpose, Equation (7) may be used to explain an inventive step of the present disclosure. If we can reduce x by a factor of a, the SNR can be boosted by $a^{2s}$. For instance, if a=2 and s=2, the SNR can be increased by a factor of 16. Furthermore, the RF signal field strength B1 also varies nonlinearly in a manner that is inversely propositional to a distance between an RF signal transmission coil and the NMR sensitive volume. From Equations (1), (2), or (4), we can expect the SNR increase proportionally. These equations show that SNR is proportional to B1, while B1 is nonlinearly inversely proportional to the distance from a of transmission coil to the sensitive volume. Thus, when the distance between the coil and sensitive volume is reduced, one will expect that the B1 decreases, as such SNR proportionally increases as B1 increases.

Figure 4:
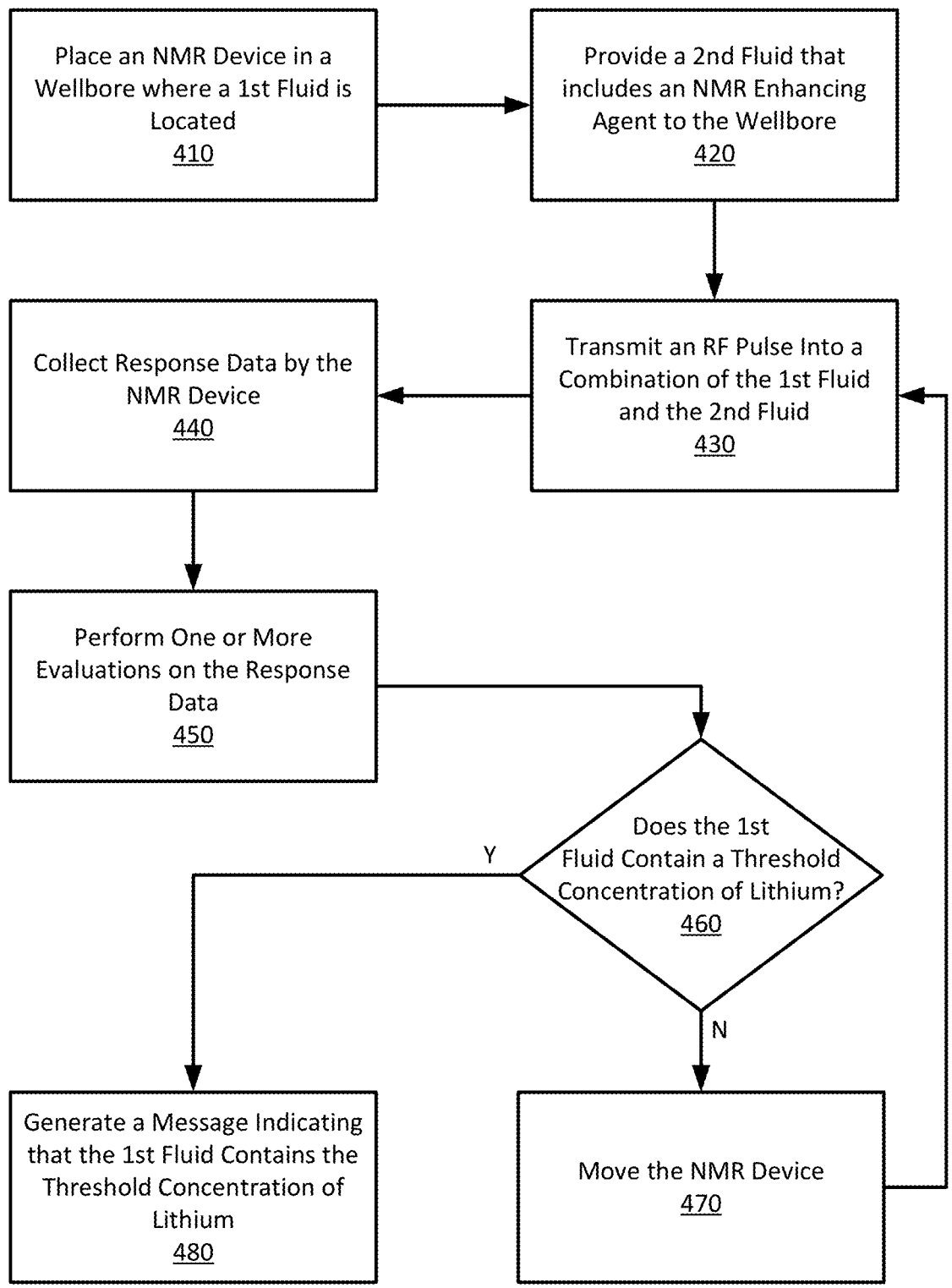
FIG. 4 illustrates actions that may be performed to identify locations where lithium may be commercially extracted from subterranean formations, in accordance with various aspects of the subject technology.

FIG. 4 illustrates actions that may be performed to identify locations where lithium may be extracted from subterranean formations. Wellbores may be drilled into the Earth such that water located in subterranean reservoirs may be tested for concentrations of lithium. At block 410, an NMR device may be deployed in a wellbore where reservoir of fluid resides. This may include lowering the NMR device into the wellbore when a drill bit drills the wellbore. Water from structures that surround the wellbore may flow into the wellbore. The water that flows into the wellbore may be the first fluid of FIG. 4. At block 420, a second fluid that includes an NMR enhancing agent may be pumped into the wellbore. This NMR enhancing agent may be characterized as a paramagnetic chemical agent. In some examples, this second fluid may include mixture of drilling mud and the NMR enhancing agent. During operations the drilling mud infused with the NMR enhancing agent may mix with wellbore fluids such that the NMR device can collect data relating to compounds (e.g., lithium compounds) in the wellbore fluids. In certain instances, the infused drilling mud may be directed into formations that surround the wellbore such that data associated with these formations may be collected. As such, the NMR device may be deployed when a "drilling" fluid that includes the NMR enhancing agent is provided to the wellbore. This drilling fluid or second fluid may include at least a target concentration of the NMR enhancing element. This target concentration may be sufficient to reduce T1 times of lithium according to a sensing rule. When the second fluid is provided to the wellbore, it may be mixed with fluid from the fluid deposits (e.g., the first fluid) when a combined fluid is formed. This mixing may occur when the wellbore is drilled. A drill bit or other tool deployed in the wellbore may be used to mix the second fluid with the first fluid.

The combined fluid may be exposed to a magnetic field generated by a magnet of the NMR device for a time sufficient to align the spins of lithium protons. At block 430, one or more pulses of RF signal may be transmitted into the combined fluid. At block 440, response data may be collected by the NMR device. Multiple different sets of RF signal pulses may be transmitted into the combined fluid and multiple different responses measurements may be made when a set of response data is collected. When NMR measurements are made, the combined fluid may be proximal to the NMR sensing device. A magnet of the NMR device may align spins of lithium protons and the NMR sensing device may transmit RF pulses into the combined fluid such that the NMR sensing device can collect data.

At block 450, one or more evaluations may be performed on the collected data. These evaluations may identify a concentration of lithium included in the first fluid. This may be identified from the response data or may be identified by first identifying a lithium concentration in the combined fluid. In the latter case, the concentration of the combined fluid along with an estimate of a volumetric density of the first fluid included in the combined fluid may be used to calculate an estimate of the lithium concentration of the first fluid.

Determination block 460 may then identify whether the response data indicates that the first fluid (the fluid from the wellbore strata) includes a threshold concentration of lithium. One or more rules may identify a concentration of lithium that meets the threshold value. When the first fluid at least includes this threshold concentration of lithium, a message may be sent indicating that the first fluid includes the threshold concentration of lithium at block 480. This message may allow managers of a lithium mining company make a decision regarding pumping liquids from the wellbore such that a lithium extraction process can be performed. When determination block 460 identifies that the first fluid does not include the threshold concentration of lithium, the NMR device may be moved at block 470 to another location of the wellbore or may be moved into another wellbore. Actions performed at block 470 may include continuing a drilling operation such that the NMR device can be lowered further into the wellbore. After block 470, the method of FIG. 4 may include transmitting another RF pulse (or set of RF pulses) into combined fluids when deposits rich in lithium are sought after.

A similar set of steps may be performed at other locations, even at locations that do not include significant amounts of lithium. In certain instances, locations where previous wellbores were drilled that were proven to have less than a threshold level of lithium may be selected for depositing water output by a process that separates lithium from brine. Techniques of the present disclosure, therefore, may be used to find areas where lithium can efficiently be extracted from and may be used to find areas where processed water can be deposited. Additionally or alternatively, water that is considered suitable for drinking or agriculture, may be provided to people to use.

While the discussion above reviews that data may be collected when an NMR device is deployed in a wellbore, techniques of the present disclosure may be performed in a laboratory environment where samples of fluids from fluid source (e.g., a surface lake, a swamp, or a subterranean reservoir) may be mixed with an NMR enhancing agent to create a combined fluid. The combined fluid may then be tested by the NMR device. Here again, data sensed by the NMR device may be evaluated to see whether a lithium concentration of the sample meets the threshold value.

Figure 5:
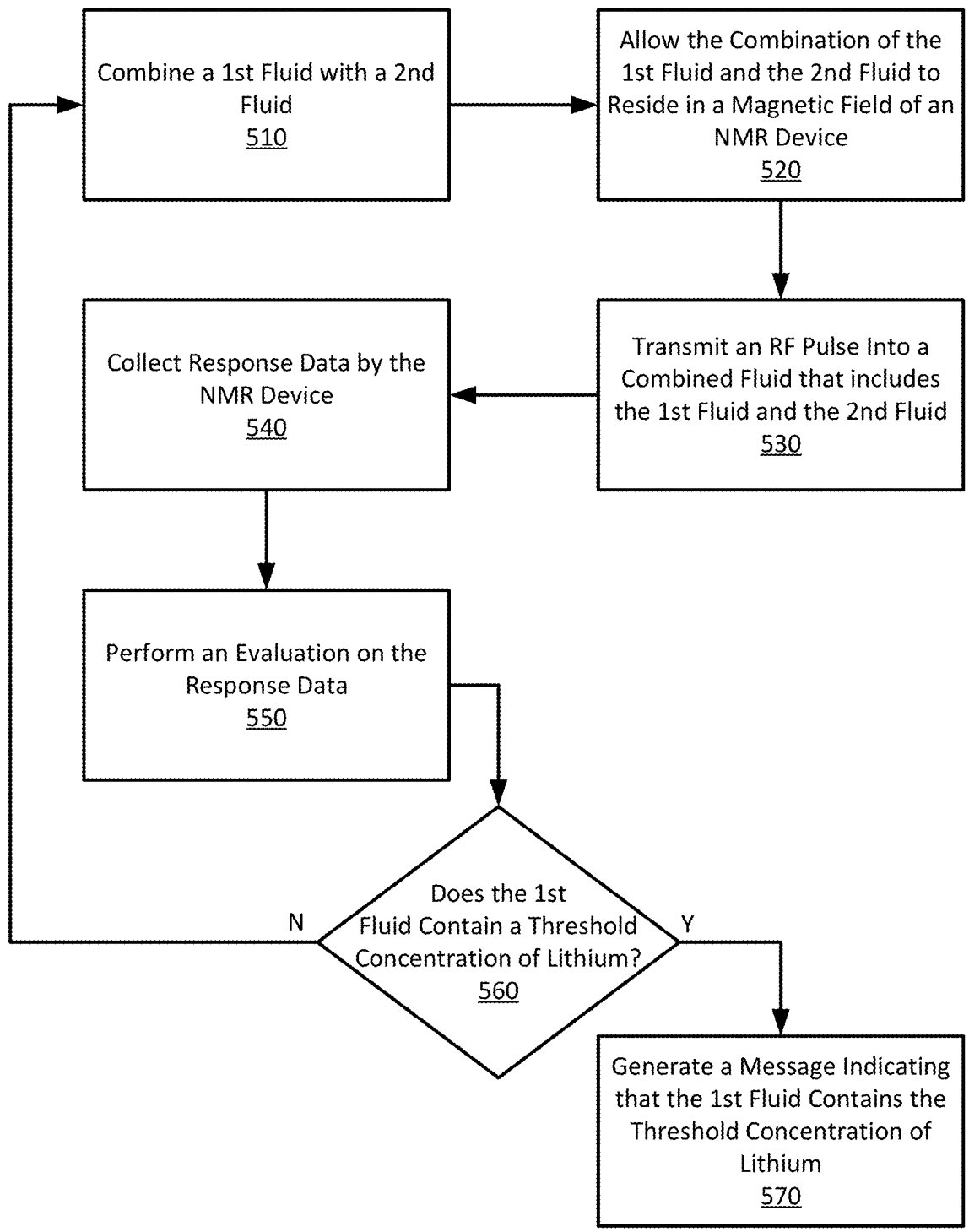
FIG. 5 illustrates actions that may be performed when a sample is tested for lithium concentrations, in accordance with various aspects of the subject technology.

FIG. 5 illustrates actions that may be performed when a sample is tested for lithium concentrations. At block 510 of FIG. 5, a first fluid may be combined with a second fluid. As discussed above in respect to FIG. 4, this first fluid may be a fluid found in a wellbore where an NMR sensing device is deployed or in formations that surround the wellbore. The various fluids discussed in respect to FIGS. 4 and 5 may be combined in the wellbore, in formations that surround the wellbore, or both. In one instance, a balanced or underbalanced drilling operation causes the first fluid to flow from the formation to the wellbore. This may result in stronger NMR signal measurements as the wellbore fluid (the first fluid) may easily mix with the second fluid in the wellbore. In another instance, for example, when an overbalanced drilling process is used, higher pressure caused by the overbalanced drilling operation may push the mud filtrate that includes the NMR enhancer into the formation. In this instance, the second fluid mixes with the first fluid through diffusion and perfusion in the formation. As such, different types of NMR measurements scenarios may be used. A particular type of NMR measurement scenarios used may be selected based on formation characteristics. This is because, some formation characteristics may not be suitable for mixing fluids inside the wellbore, so in such instances, mixing fluids inside the wellbore may not be appropriate. The mud filtrate mentioned above may include liquid portions of a drilling mud and solvents that may be dissolved in the drilling mud. As such penetration by mud filtrated into wellbore formations may help the relaxation time enhancer in the drilling mud move into the wellbore features.

Here again, the second fluid may include an NMR enhancing agent. In other instances, a sample of fluid from a wellbore or from some other location (e.g., a lake or swamp) may be collected, NMR enhancing agent may be added to the fluid sample, and then a mixture of the NMR enhancing agent and the fluid may be tested with an NMR device. As such, at block 520, a combination of the first fluid and the second fluid may be allowed to reside in the magnetic field of the NMR device for at least a T1 time period. At block 530, one or more RF pulses may be transmitted into the combined fluid and response data may be collected at block 540. At block 550, evaluations may be performed to identify a concentration of lithium included in the combined fluid. At block 560, a determination may be made as to whether the first fluid includes the threshold concentration of lithium. When concentrations of lithium do not meet the threshold concentration, the actions of FIG. 5 may be repeated. This may include drilling further into the Earth before additional measurements are made. When determination block 560 identifies that the first fluid contains the threshold concentration of lithium, a message may be sent indicating that the first fluid includes the threshold concentration of lithium at block 570. The actions performed in FIG. 5 may be a subset of the actions discussed in respect to FIG. 4.

Figure 6:
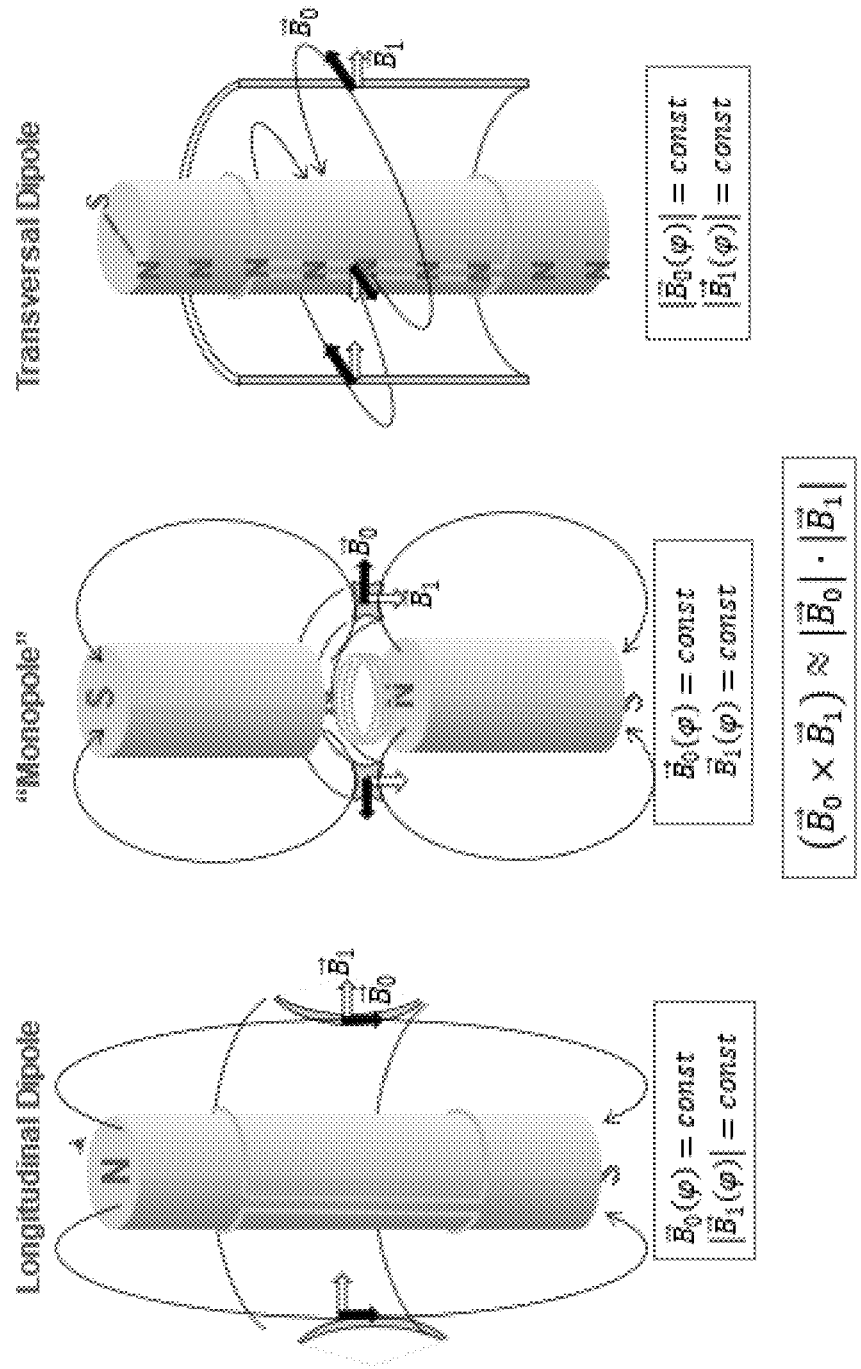
FIG. 6 illustrates several magnet/coil configurations for that may be used to measure axial symmetric sensitive volumes of material, in accordance with various aspects of the subject technology.

In one instance, an axial symmetric (e.g., mandrel type) NMR logging sensor configuration may be used. FIG. 6 illustrates several magnet/coil configurations that may be used to measure axial symmetric sensitive volumes of material. In systems and techniques of the present disclosure, the sensitive volume may be located either in a shallow depth of investigation, inside the formation containing the brine or within the borehole. This means that apparatus and techniques of the present disclosure may measure content of lithium in fluids in a wellbore or in rock formations that surround the wellbore. The sensitive volume within the borehole may help as the distance between the logging tool and the sensitive volume is shorter, therefore, both B0 and B1 will be larger for the same type of tool hardware. Furthermore, a well may be drilled using a technique referred to as underbalanced drilling. This may include, yet not be limited to, air drilling. As such, brine in a formation may easily flow from the formation to the wellbore. Therefore, a large fraction of borehole fluid will be the formation brine. The relaxation enhancer may be mixed with drilling fluids (e.g., drilling mud). In the case of air drilling, a small amount of relaxation enhancer agent can be disposed from the logging instrument periodically before measurements to reduce the $^7$Li relaxation time such that a number n of repeats may be increased.

The use of a mandrel tool inside of borehole also has an advantage over a side-looking or pad tool in that the sensitive volume is much larger as it covers all 360° surrounding the tool, thus, the sensitive volume is increased. Since The T1 enhancer is used for increasing repetitive data acquisitions, a T1 enhancing element allows a large sensitive volume to be tested. Therefore, a low-field-gradient tool configuration, such as the monopole type or longitudinal dipole type illustrated in FIG. 6 may be very useful.

In an instance when one prefers to directly log brine inside of a formation (in rocks that surround the wellbore) instead of inside the wellbore itself, a mandrel type logging tool could be used, yet it is possible that a side-looking NMR tool or a pad logging tool may have better performance as these tools may help reduce the distance between the sensor and sensitive volume.

In instances when $^7$Li is measured with an NMR inside the formation, the relaxation enhancer agent can be delivered to the sensitive volume by either doping in the mud and then by using overbalanced drilling to push the doped mud into rocks of the formation, or, in the case when a pad instrument is used, the doped mud may be delivered to the sensitive volume by injecting the agent in an aqueous solution through a pad of the instrument.

In instances when a brine sample is collected using a reservoir description tool (RDT) sampling tool, $^7$Li NMR measurements may be done using both collected samples downhole inside the tool and in the formation. When a downhole fluid sample NMR measurement is used, the measurement may be conducted until a maximum $^7$Li NMR signal is obtained. This may provide more reliable data as an actual native concentration of lithium may be detected before samples are sent to the surface for further analysis.

In yet another instance, a quantum sensor (QS) and quantum sensor array of magnetometers, can be deployed as the NMR signal detection in replacing the RF receiver coil. One such application is the use regular NMR coil to transmitting RF energy to the sensitive volume containing lithium brine, either within formation, within borehole, or within lithium brine liquid containing sample tube. The quantum sensing magnetometer or array of magnetometers to detect the NMR signal in response to the excitation. The advantage of using a QS as NMR detection is that usually it may boost the sensitivity of NMR detection. Examples of a QS for NMR detection include an alkali atopic magnetometer and a nitrogen vacancy magnetometer.

Figure 7:
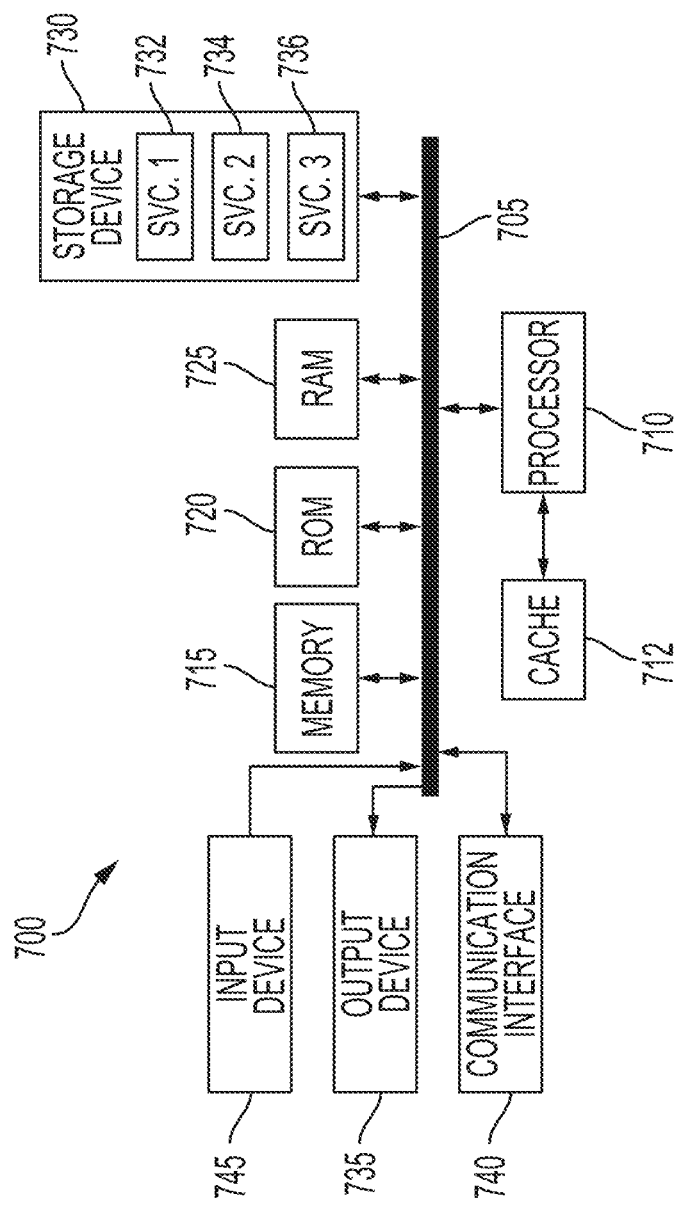
FIG. 7 illustrates an example computing device architecture which can be employed to perform any of the systems and techniques described herein.

FIG. 7 illustrates an example computing device architecture which can be employed to perform any of the systems and techniques described herein. In some examples, the computing device 700 architecture can be integrated with tools described herein. The components of the computing device architecture 700 are shown in electrical communication with each other using a connection 705, such as a bus. The example computing device architecture 700 includes a processing unit (CPU or processor) 710 and a computing device connection 705 that couples various computing device components including the computing device memory 715, such as read only memory (ROM) 720 and random access memory (RAM) 725, to the processor 710.

The computing device architecture 700 can include a cache of high-speed memory connected directly with, in close proximity to, or integrated as part of the processor 710. The computing device architecture 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other computing device memory 715 may be available for use as well. The memory 715 can include multiple different types of memory with different performance characteristics. The processor 710 can include any general-purpose processor and a hardware or software service, such as service 1 732, service 2 734, and service 3 736 stored in storage device 730, configured to control the processor 710 as well as a special-purpose processor where software instructions are incorporated into the processor design. The processor 710 may be a self-contained system, containing multiple cores or processors, a bus, memory controller, cache, etc. A multi-core processor may be symmetric or asymmetric.

To enable user interaction with the computing device architecture 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art, such as a display, projector, television, speaker device, etc. In some instances, multimodal computing devices can enable a user to provide multiple types of input to communicate with the computing device architecture 700. The communications interface 740 can generally govern and manage the user input and computing device output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof. The storage device 730 can include services 732, 734, 736 for controlling the processor 710. Other hardware or software modules are contemplated. The storage device 730 can be connected to the computing device connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method implemented in software, or combinations of hardware and software.

In some instances, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples and aspects thereof, but those skilled in the art will recognize that the application is not limited thereto. Thus, while illustrative examples and aspects of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, examples and aspects of the systems and techniques described herein can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Methods and apparatus of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Such methods may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or another word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative Aspects of the disclosure include:

Aspect 1: A method comprising: after a combined fluid is exposed to a magnetic field of a nuclear magnetic resonance (NMR) device, transmitting a radio frequency (RF) pulse into the combined fluid, the combined fluid comprising a first fluid and a second fluid, wherein the second fluid includes an NMR enhancing agent; measuring, by the NMR device, a response to the RF pulse transmitted into the combined fluid; identifying a concentration of lithium in the combined fluid based on the response; and identifying that a concentration of lithium in the first fluid corresponds to an extraction target.

Aspect 2: The method of Aspect 1, further comprising deploying the NMR device in a wellbore at a location that includes the first fluid.

Aspect 3: The method of Aspect 1 or 2, further comprising monitoring a location of the NMR device when the NMR device is deployed in a wellbore, wherein the second fluid also includes a drilling mud and the NMR enhancing agent is a paramagnetic chemical.

Aspect 4: The method of any of Aspects 1 through 3 further comprising transmitting a sequence of RF pulses according to a regimen for assessing fluids for a presence of compounds based on the enhancing fluid including the NMR enhancing agent.

Aspect 5: The method of any of Aspects 1 through 4, further comprising generating a message indicating that the concentration of the lithium in the first fluid corresponds to the extraction target.

Aspect 6: The method of any of any of Aspects 1 through 5, wherein additional fluid is extracted from a reservoir based on the concentration of lithium in the first fluid corresponding to an extraction target.

Aspect 7: The method of any of Aspects 1 through 6, further comprising: estimating relative volumes of the first fluid and the second fluid included in the combined fluid; and identifying that the relative volumes of the first fluid and the second fluid included in the combined fluid correspond to a target concentration of the NMR enhancing agent.

Aspect 8: The method of any of Aspects 1 through 7 further comprising: identifying a location where subterranean fluids include less than the threshold concentration of lithium; and generating a message identifying the location where the subterranean fluids includes less than a threshold concentration of lithium.

Aspect 9: A non-transitory computer-readable storage medium having embodied thereon instructions executable by one or more processors to implement a method comprising: controlling transmission of a radio frequency (RF) pulse into a combined fluid, the combined fluid comprising a first fluid and a second fluid after the combined fluid is exposed to a magnetic field of a nuclear magnetic resonance (NMR) device, wherein the second fluid includes an NMR enhancing agent; receiving, from the NMR device, response data associated with the RF pulse transmitted into the combined fluid; identifying a concentration of lithium in the combined fluid based on the response data; and identifying that a concentration of lithium in the first fluid corresponds to an extraction target.

Aspect 10: The non-transitory computer-readable storage medium of Aspect 9, wherein the NMR device is deployed in a wellbore at a location that includes the first fluid.

Aspect 11: The non-transitory computer-readable storage medium of Aspect 9 or 10, wherein the one or more processors execute the instructions to monitor a location of the NMR device when the NMR device is deployed in a wellbore, and wherein the second fluid also includes a drilling mud and the NMR enhancing agent is a paramagnetic chemical.

Aspect 12: The non-transitory computer-readable storage medium of any of Aspects 9 through 11, wherein the one or more processors execute the instructions to control transmission of a sequence of RF pulses according to a regimen for assessing fluids for a presence of compounds based on the enhancing fluid including the NMR enhancing agent.

Aspect 13: The non-transitory computer-readable storage medium of any of Aspects 9 through 12, wherein the one or more processors execute the instructions to generate a message indicating that the concentration of the lithium in the first fluid corresponds to the extraction target.

Aspect 14: The non-transitory computer-readable storage medium of any of Aspects 9 through 13, wherein additional fluid is extracted from a reservoir based on the concentration of lithium in the first fluid corresponding to an extraction target.

Aspect 15: The non-transitory computer-readable storage medium of any of Aspects 9 through 14, wherein the one or more processors execute the instructions to: estimate relative volumes of the first fluid and the second fluid included in the combined fluid; and identify that the relative volumes of the first fluid and the wellbore fluid included in the combined fluid correspond to a target concentration of the NMR enhancing agent.

Aspect 16: The non-transitory computer-readable storage medium of any of Aspects 9 through 15, wherein the one or more processors execute the instructions to identify a location where subterranean fluids include less than a threshold concentration of lithium; and generate a message identifying the location where the subterranean fluids includes less than the threshold concentration of lithium.

Aspect 17: An apparatus comprising: a memory; and one or more processors that executes instructions out of the memory to: control transmission of a radio frequency (RF) pulse into a combined fluid, the combined fluid comprising a first fluid and a second fluid, wherein the second fluid includes an NMR enhancing agent after the combined fluid is exposed to a magnetic field of a nuclear magnetic resonance (NMR) device, receive, from the NMR device, measurement data associated with the RF pulse transmitted into the combined fluid; identify a concentration of lithium in the combined fluid based on the response data; and identify that a concentration of lithium in the first fluid corresponds to an extraction target.

Aspect 18: The apparatus of Aspect 17, wherein the NMR device is deployed in a wellbore at a location that includes the first fluid.

Aspect 19: The apparatus of Aspect 17 or 18, wherein the one or more processors monitor a location of the NMR device when the NMR device is deployed in a wellbore, and wherein the second fluid also includes a drilling mud and the NMR enhancing agent is a paramagnetic chemical.

Aspect 20: The apparatus of any of Aspects 17 through 19, wherein the one or more processors control transmission of a sequence of RF pulses according to a regimen for assessing fluids for the presence of compounds based on the enhancing fluid including the NMR enhancing agent.

What is claimed is:

1. A method comprising:
   after a combined fluid is exposed to a magnetic field of a nuclear magnetic resonance (NMR) device, transmitting a radio frequency (RF) pulse into the combined fluid, the combined fluid comprising a first fluid and a second fluid, wherein the second fluid includes a relaxation enhancing agent, wherein a concentration of the relaxation enhancing agent is measured specifically to an element lithium to reduce a relaxation time of the lithium and allow an increase in a number of measurements of the lithium within a period of time which increases a signal to noise ratio (SNR);
   conducting repetition measurements within the period of time from the combined fluid, by the NMR device, for responses to the RF pulse transmitted into the combined fluid;
   identifying a concentration of lithium in the combined fluid based on the responses and SNR; and
   identifying that a concentration of lithium in the first fluid corresponds to an extraction target.

2. The method of claim 1, further comprising:
   deploying the NMR device in a wellbore at a location that includes the first fluid.

3. The method of claim 1, further comprising:
   monitoring a location of the NMR device when the NMR device is deployed in a wellbore, wherein the second fluid also includes a drilling mud and the relaxation enhancing agent is a paramagnetic chemical.

4. The method of claim 1, further comprising:
   transmitting a sequence of RF pulses according to a regimen for assessing fluids for a presence of compounds based on the second fluid including the relaxation enhancing agent.

5. The method of claim 1, further comprising:
   generating a message indicating that the concentration of the lithium in the first fluid corresponds to the extraction target.

6. The method of claim 1, wherein additional fluid is extracted from a reservoir based on the concentration of lithium in the first fluid corresponding to the extraction target.

7. The method of claim 1, further comprising:
   estimating relative volumes of the first fluid and the second fluid included in the combined fluid; and
   identifying that the relative volumes of the first fluid and the second fluid included in the combined fluid correspond to a target concentration of the relaxation enhancing agent.

8. The method of claim 1, further comprising:
   identifying a location where subterranean fluids include less than a threshold concentration of lithium; and
   generating a message identifying the location where the subterranean fluids include less than the threshold concentration of lithium.

9. A non-transitory computer-readable storage medium having embodied thereon instructions executable by one or more processors to implement a method comprising:
controlling transmission of a radio frequency (RF) pulse into a combined fluid after the combined fluid is exposed to a magnetic field of a nuclear magnetic resonance (NMR) device, the combined fluid comprising a first fluid and a second fluid, wherein the second fluid includes a relaxation enhancing agent, wherein a concentration of the relaxation enhancing agent is measured specifically to an element lithium to reduce a relaxation time of the lithium and allow an increase in a number of measurements of the lithium within a period of time which increases a signal to noise ratio (SNR);
receiving, from the NMR device, response data associated with the RF pulse transmitted into the combined fluid, wherein the response data include the increased SNR and repetition measurements of the combined fluid;
identifying a concentration of lithium in the combined fluid based on the response data; and
identifying that a concentration of lithium in the first fluid corresponds to an extraction target.

10. The non-transitory computer-readable storage medium of claim 9, wherein the NMR device is deployed in a wellbore at a location that includes the first fluid.

11. The non-transitory computer-readable storage medium of claim 9, wherein the one or more processors execute the instructions to:
monitor a location of the NMR device when the NMR device is deployed in a wellbore, and wherein the second fluid also includes a drilling mud and the relaxation enhancing agent is a paramagnetic chemical.

12. The non-transitory computer-readable storage medium of claim 9, wherein the one or more processors execute the instructions to:
control transmission of a sequence of RF pulses according to a regimen for assessing fluids for a presence of compounds based on the second fluid including the relaxation enhancing agent.

13. The non-transitory computer-readable storage medium of claim 9, wherein the one or more processors execute the instructions to:
generate a message indicating that the concentration of the lithium in the first fluid corresponds to the extraction target.

14. The non-transitory computer-readable storage medium of claim 9, wherein additional fluid is extracted from a reservoir based on the concentration of lithium in the first fluid corresponding to an extraction target.

15. The non-transitory computer-readable storage medium of claim 9, wherein the one or more processors execute the instructions to:
estimate relative volumes of the first fluid and the second fluid included in the combined fluid; and
identify that the relative volumes of the first fluid and the second fluid included in the combined fluid correspond to a target concentration of the relaxation enhancing agent.

16. The non-transitory computer-readable storage medium of claim 9, wherein the one or more processors execute the instructions to:
identify a location where subterranean fluids include less than a threshold concentration of lithium; and
generate a message identifying the location where the subterranean fluids include less than the threshold concentration of lithium.

17. An apparatus comprising:
a memory; and
one or more processors coupled to the memory, wherein the one or more processors are configured to:
control transmission of a radio frequency (RF) pulse into a combined fluid after the combined fluid is exposed to a magnetic field of a nuclear magnetic resonance (NMR) device, the combined fluid comprising a first fluid and a second fluid, wherein the second fluid includes a relaxation enhancing agent, wherein a concentration of the relaxation enhancing agent is measured specifically to an element lithium to reduce a relaxation time of the lithium and allow an increase in a number of measurements of the lithium within a period of time which increases a signal to noise ratio (SNR);
receive, from the NMR device, response data associated with the RF pulse transmitted into the combined fluid, wherein the response data include the increased SNR and repetition measurements of the combined fluid;
identify a concentration of lithium in the combined fluid based on the response data; and
identify that a concentration of lithium in the first fluid corresponds to an extraction target.

18. The apparatus of claim 17, wherein the NMR device is deployed in a wellbore at a location that includes the first fluid.

19. The apparatus of claim 17, wherein the one or more processors:
monitor a location of the NMR device when the NMR device is deployed in a wellbore, and wherein the second fluid also includes a drilling mud and the relaxation enhancing agent is a paramagnetic chemical.

20. The apparatus of claim 17, wherein the one or more processors:
control transmission of a sequence of RF pulses according to a regimen for assessing fluids for a presence of compounds based on the enhancing fluid including the relaxation enhancing agent.

* * * * *